United States Patent
Saffar et al.

(10) Patent No.: US 11,275,551 B2
(45) Date of Patent: Mar. 15, 2022

(54) SYSTEM FOR VOICE-BASED ALERTING OF PERSON WEARING AN OBSTRUCTIVE LISTENING DEVICE

(71) Applicant: Dell Products L.P., Round Rock, TX (US)

(72) Inventors: Or Herman Saffar, Beer Sheva (IL); Noga Gershon, Dimona (IL); Amihai Savir, Sansana (IL)

(73) Assignee: Dell Products L.P., Round Rock, TX (US)

( * ) Notice: Subject to any disclaimer, the term of this patent is extended or adjusted under 35 U.S.C. 154(b) by 149 days.

(21) Appl. No.: 16/558,887

(22) Filed: Sep. 3, 2019

(65) Prior Publication Data

US 2021/0064329 A1 Mar. 4, 2021

(51) Int. Cl.
*G06F 3/16* (2006.01)
*G10L 25/84* (2013.01)
(Continued)

(52) U.S. Cl.
CPC ............ *G06F 3/165* (2013.01); *G08B 5/22* (2013.01); *G10L 15/063* (2013.01); *G10L 15/08* (2013.01);
(Continued)

(58) Field of Classification Search
CPC ......... G06F 3/165; G08B 5/22; G10L 15/063; G10L 15/08; G10L 15/22; G10L 25/84;
(Continued)

(56) References Cited

U.S. PATENT DOCUMENTS 10,617,842 B2 * 4/2020 Espi Maques ... G10K 11/17873
2007/0189544 A1 * 8/2007 Rosenberg ........... G11B 27/105
381/57
(Continued)

FOREIGN PATENT DOCUMENTS

WO WO-2017120961 A1 * 7/2017 ............... H04R 1/10

OTHER PUBLICATIONS

Kiran Bhuvanagirir et al., Mixed Language Speech Recognition without Explicit Identification of Language, American Journal of Signal Processing 2012, 2(5): 92-97.
(Continued)

*Primary Examiner* — Mohammad K Islam
(74) *Attorney, Agent, or Firm* — Terrile, Cannatti & Chambers; Stephen A. Terrile

(57) ABSTRACT

A method, system and computer-usable medium are disclosed for voice-based alerting of an individual wearing an obstructive listening device. Certain embodiments include detecting speech in an ambient environment in which the person wearing the obstructive listening device is present; determining whether the detected speech includes a name of the person wearing the obstructive listening device; if the detected speech includes the name of the person wearing the obstructive listening device determining whether the name of the person was spoken using a calling speech characteristic; and if the name of the person was spoken using a calling speech characteristic, automatically alerting the person wearing the obstructive listening device that another person in the ambient environment is calling for attention of the person wearing the obstructive listening device.

13 Claims, 8 Drawing Sheets

(51) Int. Cl.
  *G10L 15/22* (2006.01)
  *G10L 15/08* (2006.01)
  *G08B 5/22* (2006.01)
  *G10L 15/06* (2013.01)
(52) U.S. Cl.
  CPC .............. *G10L 15/22* (2013.01); *G10L 25/84* (2013.01); *G10L 2015/088* (2013.01)
(58) Field of Classification Search
  CPC ... G10L 2015/088; H04R 5/033; H04R 3/005; H04R 1/1016; H04R 2410/01
  See application file for complete search history.

(56) References Cited

U.S. PATENT DOCUMENTS

| | | | | |
|---|---|---|---|---|
| 2014/0300466 A1* | 10/2014 | Park | ................. | H04M 1/72454 340/539.11 |
| 2015/0222977 A1* | 8/2015 | Angel, Jr. | .............. | H04R 1/105 381/74 |
| 2016/0188284 A1* | 6/2016 | Lu | ............................ | H04R 5/04 381/74 |
| 2016/0360384 A1* | 12/2016 | Park | ........................ | G06F 3/167 |
| 2016/0381450 A1* | 12/2016 | Taite | ........................ | G08B 3/10 381/74 |
| 2017/0117004 A1* | 4/2017 | Lee | ........................ | G10L 25/51 |
| 2017/0194020 A1* | 7/2017 | Miller | ..................... | G10L 25/51 |
| 2018/0249250 A1* | 8/2018 | Pate | ..................... | H04R 1/1041 |
| 2019/0378520 A1* | 12/2019 | Chiu | ....................... | G10L 17/26 |

OTHER PUBLICATIONS

Tal Levy et al., The Effect of Pitch, Intensity and Pause Duration in Punctuation Detection, 2012 IEEE 27th Convention of Electrical and Electronics Engineers in Israel, 4 pages.

Bin Ma et al., Multilingual Speech Recognition with Language Identification, 7th International Conference on Spoken Language Processing [ICSLP2002], Denver, CO, Sep. 16-20, 2002, 4 pages.

* cited by examiner ature, using the information handling system to automatically alert the person wearing the obstructive listening device that another person in the ambient environment is calling for attention of the person wearing the obstructive listening device. Other embodiments of this aspect include corresponding computer systems, apparatus, and computer programs recorded on one or more computer storage devices, each configured to perform the actions of the methods.

SYSTEM FOR VOICE-BASED ALERTING OF PERSON WEARING AN OBSTRUCTIVE LISTENING DEVICE

BACKGROUND OF THE INVENTION

Field of the Invention

The present invention relates to information handling systems. More specifically, embodiments of the invention relate to systems for voice-based alerting of a person wearing headphones or other obstructive listening device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use.

Information handling systems often include a mechanism for providing audio output to a user. In certain systems, the mechanism includes audio devices that may provide audio output directly (e.g., a wired connection) or indirectly (e.g., a Bluetooth connection) to speakers. In certain systems, the speakers include headphones, earphones, or other audio output transducers that, when worn, obstruct the wearer from properly hearing the sounds in the wearer's ambient environment.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by an information handling system, cause the apparatus to perform the actions. One general aspect includes a computer-implemented method for voice-based alerting of a person wearing an obstructive listening device, including: detecting speech in an ambient environment in which the person wearing the obstructive listening device is present, where the speech is detected at an audio transducer of an information handling system; determining, using the information handling system, whether the detected speech includes a name of the person wearing the obstructive listening device; if the detected speech includes the name of the person wearing the obstructive listening device, determining, using the information handling system, whether the name of the person was spoken using a calling speech characteristic; and if the name of the person was spoken using a calling speech characteristic, using the information handling system to automatically alert the person wearing the obstructive listening device that another person in the ambient environment is calling for attention of the person wearing the obstructive listening device.

Another general aspect includes a system including a processor; a data bus coupled to the processor; and a non-transitory, computer-readable storage medium embodying computer program code, the non-transitory, computer-readable storage medium being coupled to the data bus, the computer program code interacting with a plurality of computer operations and including instructions executable by the processor and configured for: detecting speech in an ambient environment in which a person wearing an obstructive listening device is present, where the speech is detected at an audio transducer of an information handling system; determining, using the information handling system, whether the detected speech includes a name of the person wearing the obstructive listening device; if the detected speech includes the name of the person wearing the obstructive listening device, determining, using the information handling system, whether the name of the person was spoken using a calling speech characteristic; and if the name of the person was spoken using a calling speech characteristic, using the information handling system to automatically alert the person wearing the obstructive listening device that another person in the ambient environment is calling for attention of the person wearing the obstructive listening device.

Another general aspect includes a non-transitory, computer-readable storage medium embodying computer program code, the computer program code including computer executable instructions configured for: detecting speech in an ambient environment in which a person wearing an obstructive listening device is present, where the speech is detected at an audio transducer of an information handling system; determining, using the information handling system, whether the detected speech includes a name of the person wearing the obstructive listening device; if the detected speech includes the name of the person wearing the obstructive listening device, determining, using the information handling system, whether the name of the person was spoken using a calling speech characteristic; and if the name of the person was spoken using a calling speech characteristic, using the information handling system to automatically alert the person wearing the obstructive listening device that another person in the ambient environment is calling for attention of the person wearing the obstructive listening device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
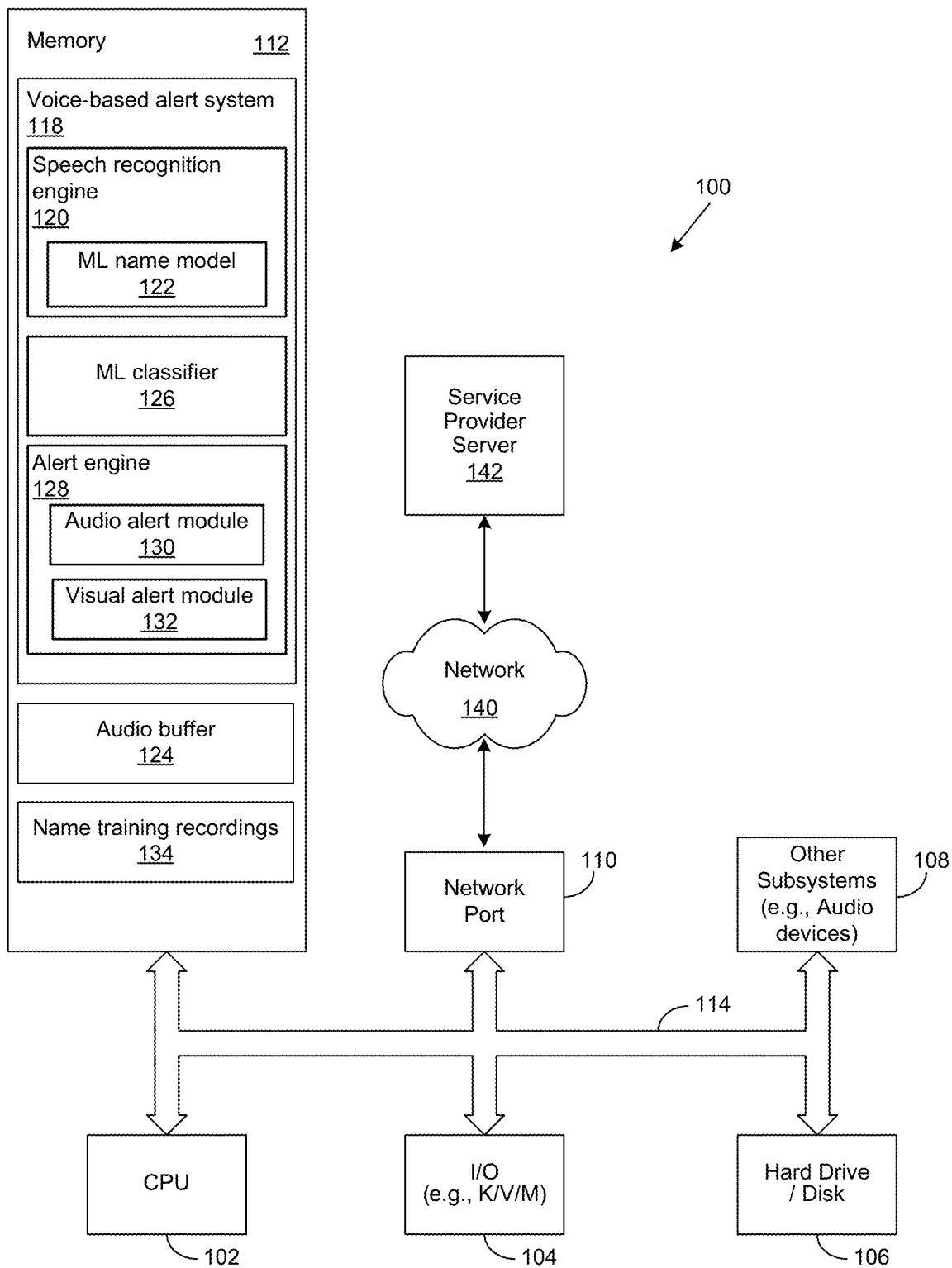
FIG. 1 shows a general illustration of components of an information handling system as implemented in the system and method of the present invention.

A system, method, and computer-readable medium are disclosed for implementing a system for voice-based alerting of a person using an obstructive listening device. As used herein, an "obstructive listening device" includes a device used by an individual to listen to audio but diminishes the ability of the individual to hear other sounds in their environment. Examples of obstructive listening devices include, for example, headphones, earphones, headsets, etc.

Certain aspects of the disclosed system appreciate that users spend a lot of time wearing obstructive listening devices (e.g., earphones, earbuds, headsets, etc.) while listening to audio such as music, audio books, or when watching television. Certain aspects of the disclosed system appreciate that users wearing an obstructive listening device may be unaware of the sounds occurring in the user's ambient environment. As such, users of obstructive listening devices may not hear when someone calls out their name. As an example, while at home a child could watch TV while wearing a headset and not notice when his parent is calling for the child's attention.

Certain embodiments also recognize that many working areas are open spaces in which employees often use obstructive listening devices as a way to filter out noise and to stay concentrated and focused on their work. Certain embodiments recognize that wearing an obstructive listening device sometimes compromises the teamwork of individuals while working in open space office environments since it is often difficult to get the attention of the individual wearing the obstructive listening device to, for example, participate in a conversation. Certain aspects of the disclosed system recognize that efficiency may be improved while working in an open space office environment if the attention of the individual wearing the obstructive listening device may be obtained without undue interference with the individual and/or others in proximity to the individual.

Certain aspects of the disclosed embodiments are directed to provide an automated way to obtain the attention of a person wearing an obstructive listening device by calling out the name of the person. In certain embodiments, speech is detected in an ambient environment in which the person wearing the obstructive listening device is present. Certain embodiments analyze the detected speech to determine whether the speech includes the name of the person wearing the obstructive listening device. If the speech includes the name of the person wearing the obstructive listening device, certain embodiments determine whether the name of the person was spoken using a calling speech characteristic. As used herein, a "calling speech characteristic" includes speech characteristics associated with an attempt to directly address or otherwise obtain the attention of the person wearing the obstructive listening device. As used herein, a "mentioning speech characteristic" includes speech characteristics that indicate that the name of the person was spoken in a manner other than with a "calling speech characteristic," where there is no need to alert the person wearing the obstructive listening device. For example, a mentioning speech characteristic may be used when an individual within the ambient environment merely speaks about the individual wearing the obstructive listening device in a conversational manner (e.g., reading a document containing the name of the individual wearing the obstructive listening device, speaking to another individual about the individual wearing the obstructive listening device, etc.).

Certain embodiments may be implemented in an information handling system, such as a laptop computing system, a desktop computing system, a mobile device, etc. In certain embodiments, entertainment systems, such as audio entertainment systems, television entertainment systems, etc., may include one or more portions of an embedded information handling system which may incorporate the disclosed system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the disclosed system and method. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In certain embodiments, the other subsystems 108 include one or more audio devices used to provide audio content to a user of the information handling system 100. In certain embodiments, such audio content is provided from the audio device to the user at one or more transducers connected to the audio devices through a wired and/or wireless connection. In certain embodiments, the transducers include earphones, ear buds, headphones, or other obstructive listening device.

In various embodiments, the information handling system 100 also includes a network port 110 operable to connect to a network 140, which is likewise accessible by a service provider server 142. The information handling system 100 likewise includes system memory 112, which is interconnected to the foregoing via one or more buses 114. System memory 112 further comprises an operating system (OS) 116 and in various embodiments may also comprise a voice-based alert system 118. In certain embodiments, the voice-based alert system 118 includes various modules that may be used in the training and execution of certain embodiments of the voice-based alert system 118.

In certain embodiments, the voice-based alert system 118 includes a speech recognition engine 120 having a machine learning module 122, which is trained to recognize the name of one or more users of the information handling system 100 as detected in speech occurring in the ambient environment. In certain embodiments, the machine learning model 122 has been trained to recognize the names of one or more users of the information handling system 100. In certain embodiments, the names of the one or more users correspond to users who are likely to listen to audio output from one or more of the audio devices 108 with an obstructive listening device.

In certain embodiments, ambient environment audio is detected by an audio transducer to an audio input of one or more of the audio devices 108. In certain embodiments, the audio transducer may be a microphone built into the information handling system 100. In certain embodiments, the audio transducer may be in the form of a microphone integrated into the obstructive listening device. In certain embodiments, the audio transducer may be in the form of one or more microphones that are located within the ambient environment at locations separate from the information handling system 100 and obstructive listening device. In certain embodiments, multiple audio transducers may be disposed in the ambient environment in an array that is configured to limit detection of ambient audio to a particular area and/or cubicle within the office environment. It will be recognized, based on the teachings of the present disclosure, that other types of audio transducers and corresponding locations of the audio transducers may be employed.

In certain embodiments, the audio detected in the ambient environment is converted to a digital format, and stored in an audio buffer 124. In certain embodiments, the speech recognition engine 120 analyzes the stored digitized audio using the machine language model 122 to determine whether the name of the user wearing the obstructive listening device is detected within the digitized audio. In those instances in which the detected speech includes the name of the user wearing the obstructive listening device, a machine language classifier 126 analyzes the digitized audio to determine whether the digitized audio has spoken the name with calling speech characteristics.

In certain embodiments, the voice-based alert system 118 also includes an alert engine 128. In certain embodiments, the alert engine 128 is configured to provide the user wearing the obstructive listening device with an alert when the name of the user is detected and has a calling speech characteristic. As an example, the speech recognition engine 120 may detect that the audio in the ambient environment includes the name of the user wearing the obstructive listening device as determined by the machine language model 122. If the name of the person is detected, the machine language classifier 126 classifies the manner in which the name was spoken to determine whether the name was spoken using calling speech characteristics. If the name of the user wearing the obstructive listening device has been spoken using calling speech characteristics, the alert engine 128 provides an alert to the user wearing the obstructive listening device. The alert is provided to the user to indicate that a person in the user's ambient environment is trying to obtain the user's attention.

The alert engine 128 may provide the alert to the user wearing the obstructive listening device in one or more manners in certain embodiments. In certain embodiments, the alert engine 128 includes an audio alert module 130. In certain embodiments, the audio alert module 130 is configured to interact with the audio device 108 providing audio to the obstructive listening device. In certain embodiments, the interaction includes reducing the volume of the audio provided from the audio device 108 to the obstructive listening device. In certain embodiments, the interaction includes a repetition of the detected speech containing the name of the user so that the user has a way of identifying the individual calling the user's name. In certain embodiments, the speech recognition engine 120 may specifically identify the individual calling the user's name with the machine language classifier 126. As an example, the audio alert module 130 may synthesize speech that speaks the name of the individual calling the user's name. Based on the teachings of the present disclosure, it will be recognized that other manners of manipulating audio to provide the audio alert may be employed.

In certain embodiments, the alert engine 128 includes a visual alert module 132. In certain embodiments, the visual alert module 132 is configured to interact with one or more devices to provide a visual alert to the user that an individual is calling out the user's name in an effort to obtain the user's attention. In certain embodiments, the visual alert module 132 may be configured to interact with a display of the information handling system 100. In certain embodiments, the interaction includes providing a message, or other visual indication, on the display of the information handling system 100 indicating that an individual is calling out the user's name using a calling speech characteristic. In certain embodiments, the speech recognition engine 120 may specifically identify the individual calling the user's name with the machine language classifier 126 by, for example, displaying the name of the individual calling out the user's name. Based on the teachings of the present disclosure, it will be recognized that other manners of displaying the visual alert may be employed.

In certain embodiments, the machine language model 122 is trained to recognize specific user names. In certain embodiments, the machine language model 122 is trained to recognize specific user names as spoken by specific individuals that are likely to be in the ambient environment of the user of the obstructive listening device. In certain embodiments, memory 112 may include name training recordings 134 that are used to train the machine language model 122. In certain embodiments, the name training recordings 134 are recorded during an initial training operation and used to train the machine model 122.

FIG. 2 through FIG. 5 show ambient environments depicting exemplary use cases for certain embodiments of the disclosed system. In the depicted exemplary use cases, the name of an individual is emphasized in the figures when it is spoken with speech characteristics indicating that the speaker is attempting to obtain the attention of the individual having that name. Similarly, the name of the individual is not emphasized when the name is used with mentioning speech characteristics.

Figure 2:
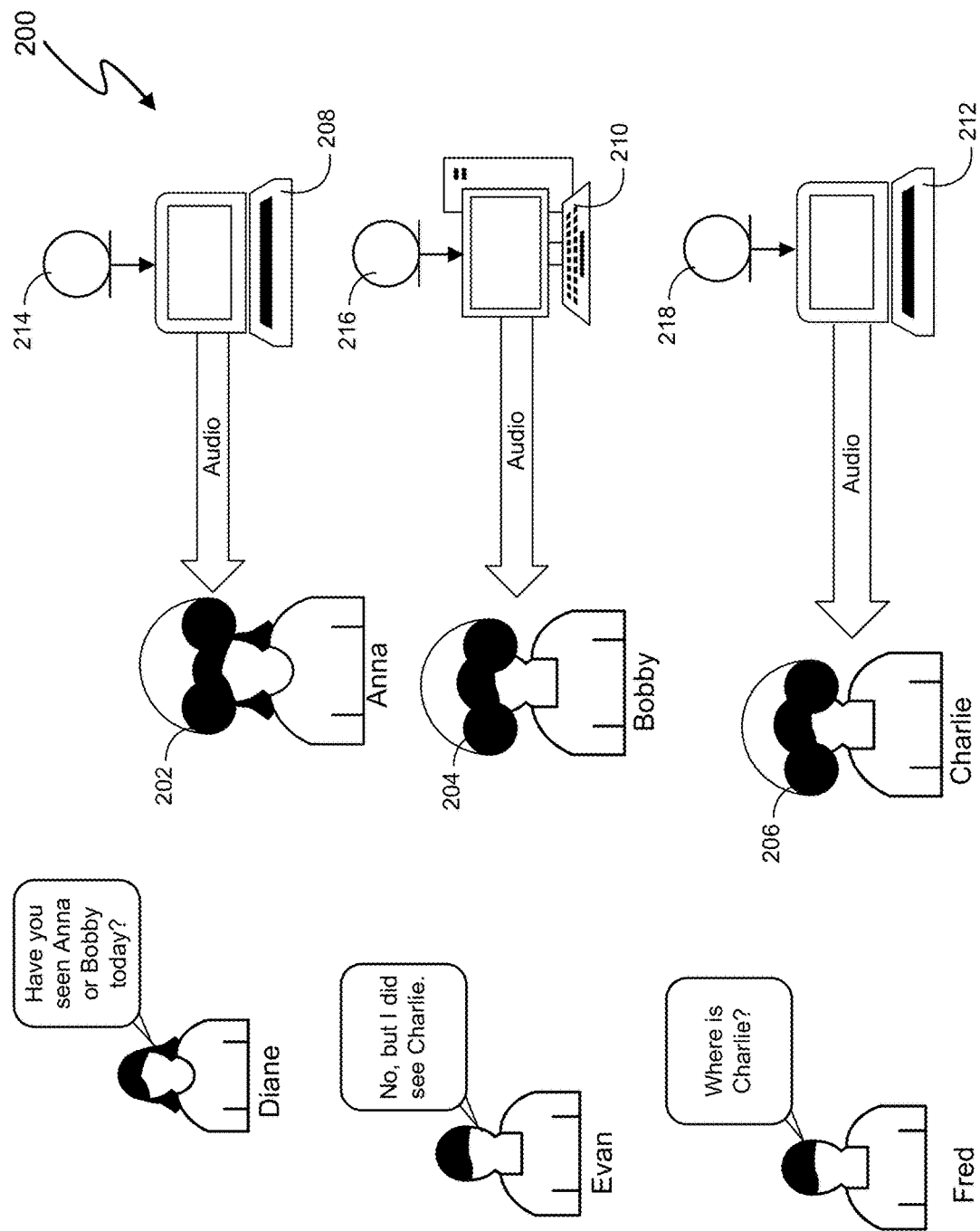
FIG. 2 shows an ambient environment depicting an exemplary use case for certain embodiments of the disclosed system.

FIG. 2 shows an ambient environment 200 in which certain embodiments of the disclosed system may be employed. In FIG. 2, a specific use case of the disclosed system is illustrated. In the ambient environment 200, there are three users "Anna," "Bobby," and "Charlie," each using their own obstructive listening devices 202, 204, 206, that are receiving audio from respective information handling systems 208, 210, and 212. In this example, each information handling systems 208, 210, and 212, include respective audio transducers (e.g., microphone) 214, 216, and 218. However, various manners of providing ambient audio to the information handling systems 206, 210, and 212 may be employed. For example, one or more of the audio transducers 214, 216, and 218 may be microphones built into the respective information handling systems 208, 210, and 212. In certain embodiments, one or more of the audio transducers 214, 216, and 218 may be in the form of microphones integrated into the obstructive listening devices 202, 204, and 206 of the users. In certain embodiments, the audio transducers 214, 216, and 218 may be in the form of one or more microphones that are arranged within the ambient environment 200 at locations separate from the information handling systems 208, 210, and 212, and obstructive listening devices 202, 204, and 206. In certain embodiments, multiple audio transducers may be disposed in the ambient environment 200 in an array that is configured to limit detection of ambient audio to a particular area and/or cubicle within the office environment. In certain embodiments, there may be more audio transducers or fewer audio than the number of information handling systems. In certain embodiments, for example, a single audio transducer may provide ambient audio to multiple information handling systems. It will be recognized, based on the teachings of the present disclosure, that other types of audio transducers and corresponding locations of the audio transducers may be employed to detect audio in the ambient environment.

In the specific use case shown in FIG. 2, three individuals—Diane, Evan, and Fred—speak in the ambient audio environment 200. In this example, Diane asks, "Have you seen Anna or Bobby today?" The speech characteristics of the reference to "Anna" and "Bobby" in the question indicate that Diane is merely making an inquiry mentioning Anna and Bobby as opposed to attempting to obtain the attention of Anna or Bobby. In this example, Evan states, "No, but I did see Charlie." The speech characteristics of the reference to "Charlie" in the statement indicates that Evan is merely making a statement mentioning Charlie as opposed to attempting to obtain Charlie's attention. Also, in this example, Fred asks, "Where is Charlie?" Again, the speech characteristics of the reference to "Charlie" in the question indicates that Fred is merely posing a question mentioning Charlie as opposed to attempting to obtain Charlie's attention.

Figure 3:
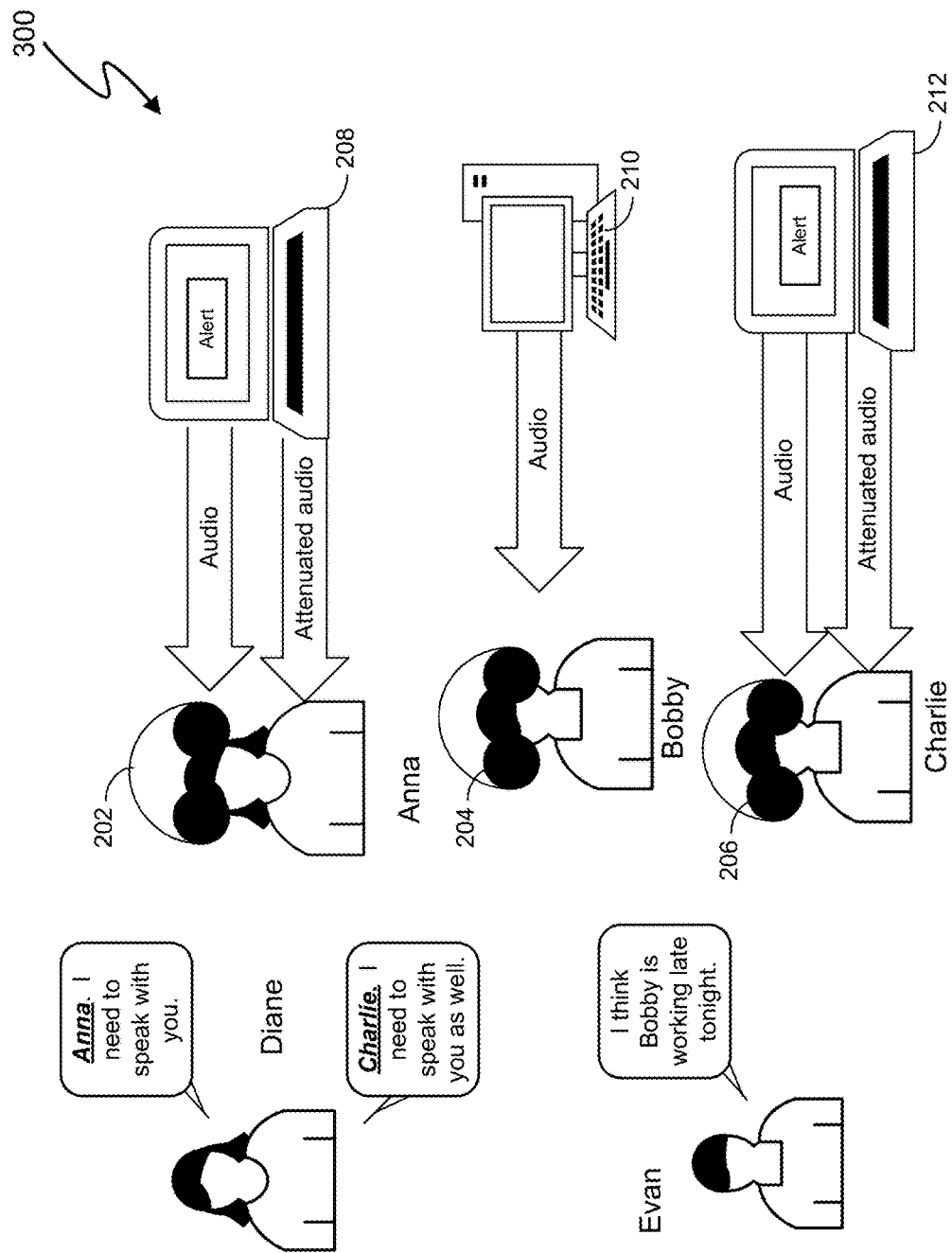
FIG. 3 shows an ambient environment depicting another exemplary use case for certain embodiments of the disclosed system.

FIG. 3 shows an ambient environment 300 depicting another exemplary use case for certain embodiments of the disclosed system. Again, there are three users "Anna," "Bobby," and "Charlie," each using their own obstructive listening devices 202, 204, 206, that are receiving audio from respective information handling systems 208, 210, and 212. In this example, Diane states, "Anna, I need to speak with you." The speech characteristics of the reference to "Anna" in the request indicates that Diane is attempting to obtain Anna's attention. Accordingly, certain embodiments of the disclosed system provide an alert to Anna that someone within the ambient environment 300 is attempting to obtain Anna's attention. In the depicted example, the alert to Anna is in the form of attenuated audio from the information handling device 208 to the obstructive listening device 202. A visual alert is also provided to Anna on the display of her information handling device 208. In certain embodiments, the visual alert may include a display of the name "Diane."

In the example depicted in FIG. 3, Diane also states, "Charlie, I need to speak with you as well." The speech characteristics of the reference to "Charlie" in the request indicate that Diane is attempting to obtain Charlie's attention. Accordingly, certain embodiments of the disclosed system provide an alert to Charlie that someone within the ambient environment 300 is attempting to obtain Charlie's attention. In the depicted example, certain embodiments attenuate the audio provided from the information handling device 212 to the obstructive listening device 206 used by Charlie. A visual alert may also be provided to Charlie on the display of his information handling system 212. In certain embodiments, the visual alert may include a display of the name "Diane."

Also in this example, Evan states, "I think Bobby is working late tonight." However, the speech characteristics of the reference to "Bobby" in the question indicate that Fred is merely making a statement mentioning Bobby as opposed to attempting to obtain Bobby's attention. Accordingly, the information handling system 210 does not provide an alert to Bobby.

Figure 4:
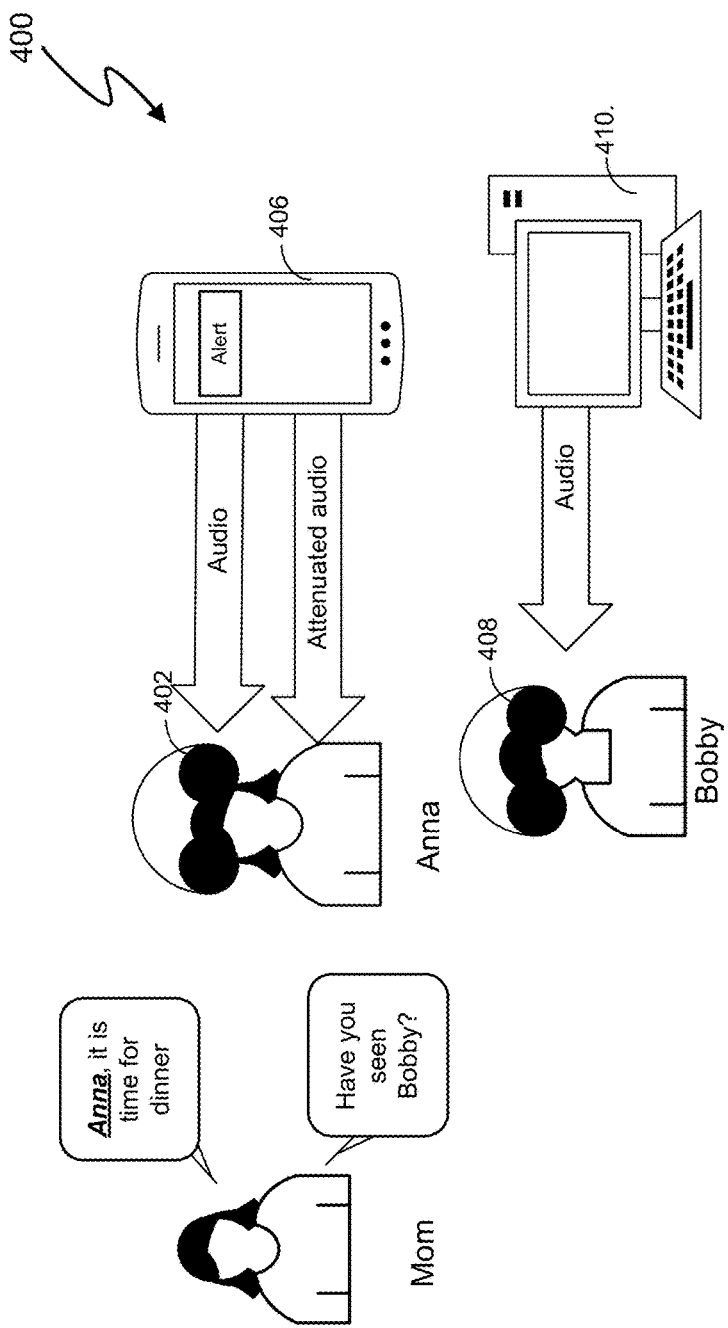
FIG. 4 shows an ambient environment depicting another exemplary use case for certain embodiments of the disclosed system.

FIG. 4 shows an ambient environment 400 depicting another exemplary use case for certain embodiments of the disclosed system. In the ambient environment 400, there are two users, "Anna" and "Bobby," each using their own obstructive listening devices 402 and 408 that are receiving audio from respective information handling systems 406 (e.g., smartphone) and 410 (e.g., gaming console). In this example, there is a single individual, "Mom," speaking in the ambient environment 400. Here, Mom states, "Anna, it is time for dinner." The speech characteristics of the reference to "Anna" in the request indicate that Mom is attempting to obtain Anna's attention. Accordingly, certain embodiments of the disclosed system provide an alert to Anna that someone within the ambient environment 300 is attempting to obtain Anna's attention. Here, a visual alert message is provided on the display of information handling system 406, and the audio to the obstructive listening device 402 is attenuated.

Also, Mom asks, "Have you seen Bobby?" The speech characteristics of the reference to "Bobby" in the question indicate that Mom is merely making an inquiry mentioning Bobby as opposed to attempting to obtain Bobby's attention. Accordingly, the information handling system 410 ignores the reference to "Bobby" and does not provide an alert in response to Mom's question.

Figure 5:
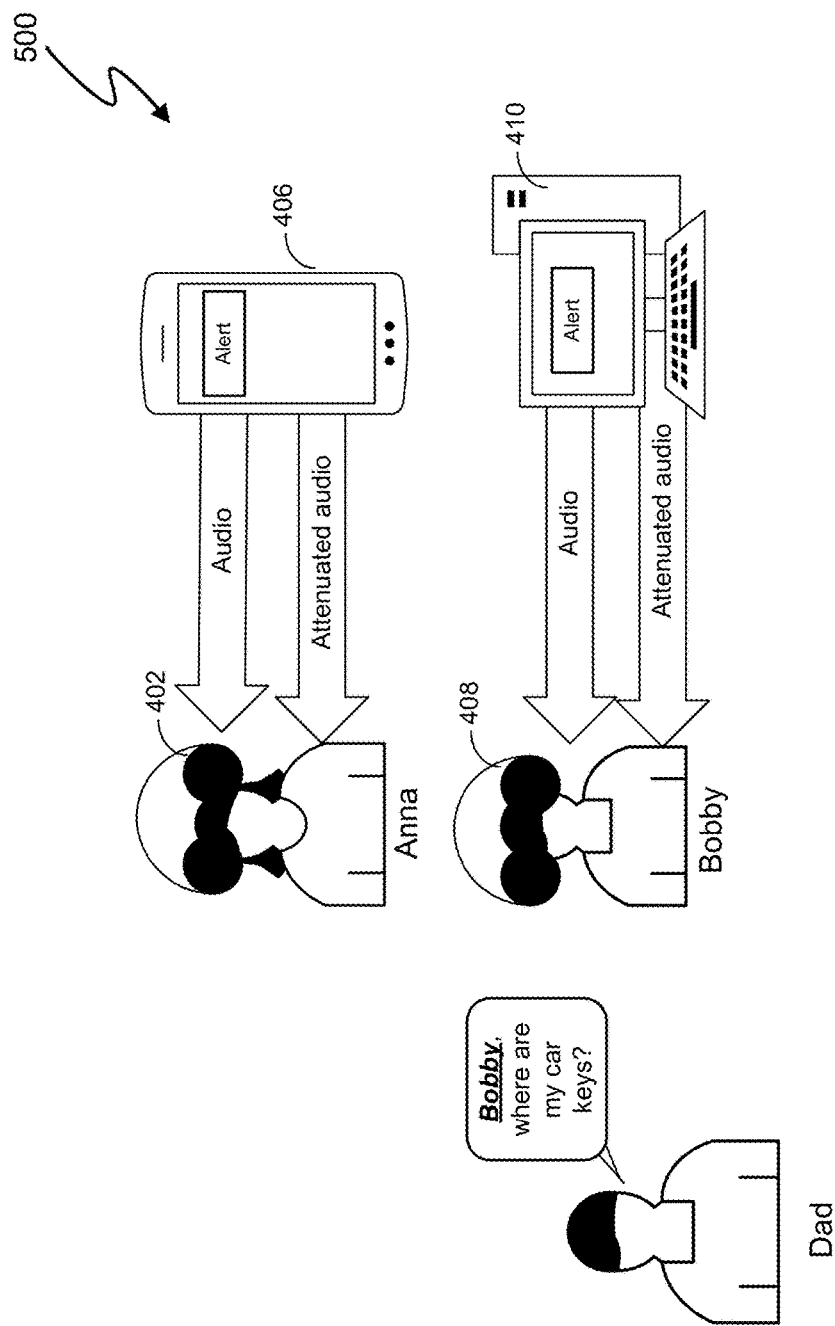
FIG. 5 shows an ambient environment depicting another exemplary use case for certain embodiments of the disclosed system.

FIG. 5 shows an ambient environment 500 depicting another exemplary use case for certain embodiments of the disclosed system. Again, there are two users, "Anna" and "Bobby," in the ambient environment 500, each using their own obstructive listening devices 402 and 408 that are receiving audio from respective information handling systems 406 (e.g., smartphone) and 410 (e.g., gaming console). In this example, there is a single individual, "Dad," speaking in the ambient environment 500. Here, Dad asks, "Bobby, where are my car keys?" The speech characteristics of the reference to "Bobby" in the request indicate that Dad is attempting to obtain Bobby's attention. Accordingly, certain embodiments of the disclosed system provide an alert to Bobby that someone within the ambient environment 500 is attempting to obtain Bobby's attention. Here, a visual alert message is provided on the display of information handling system 410 and the audio to the obstructive listening device 408 is attenuated.

Figure 6:
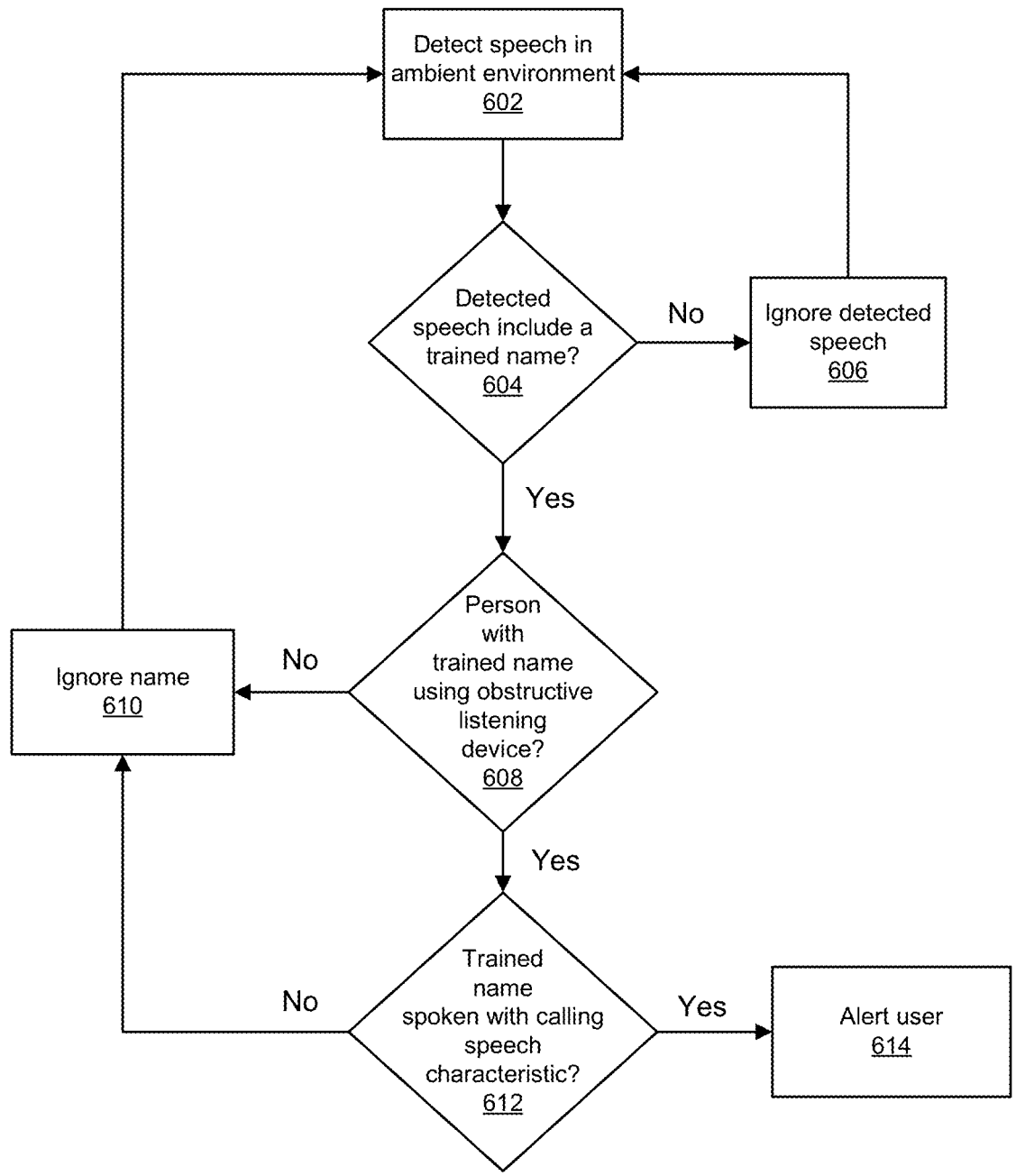
FIG. 6 is a flowchart depicting exemplary operations that may be executed in certain embodiments of the disclosed system.

FIG. 6 is a flowchart depicting exemplary operations that may be executed in certain embodiments of the disclosed system. In this example, it is assumed that the disclosed system has been trained using recorded names of individuals who are likely to listen to audio on an obstructive listening device of the disclosed system. In certain embodiments, the disclosed system may implement an initialization/learning operation in which names of certain potential users are recorded and used to train the machine learning model of the speech recognition engine. As an example, recordings of one or more individuals stating a name of a user who is likely to listen to audio on the disclosed system may be used to train the machine learning model. In such instances, certain embodiments limit the number of names that need to be trained, thereby potentially reducing the storage needed for the machine learning model and increasing the overall accuracy of the speech recognition system.

In certain embodiments, speech is detected in the ambient environment at operation 602. In certain embodiments, a determination is made at operation 604 as to whether the detected speech includes a trained name. If a trained name is not detected in the speech, the speech is ignored at operation 606, and the disclosed system continues to detect and analyze speech in the ambient environment.

If the detected speech includes a trained name, a determination may be made at operation 608 as to whether the person with the trained name is using an obstructive listening device. In certain embodiments, this determination may involve querying one or more audio devices of the information processing system to ascertain whether an audio device is connected to an obstructive listening device. As an example, certain embodiments may determine whether the audio device is connected to a wireless device, such as Bluetooth earphones, Bluetooth headphones, Bluetooth earbuds, etc. In certain embodiments, the type of device may be identified by querying the names of listening devices currently receiving audio over a Bluetooth connection. In certain embodiments, the disclosed system may determine whether a connected listening device is a listening device operating openly in the ambient environment (e.g., speakers, entertainment sound systems, etc.) or an obstructive listening device that is providing personal audio to the user. In certain embodiments, the name in the detected speech is ignored at operation 610 if the audio from the disclosed system is provided to a listening device in the ambient environment.

It will be recognized, in view of the teachings of the present disclosure, that the initial determination at operation 604 may be inaccurate or otherwise not obtainable in cases in which the listening device is openly providing audio in the ambient environment since the audio provided by the listening device may interfere with the detection of speech in the ambient environment. Accordingly, certain embodiments may disable the detection of speech at operation 602 until such time as audio is provided to an obstructive listening device.

If the detected speech includes a trained name of a user who is receiving audio using an obstructive listening device, a determination may be made at operation 612 as to whether the trained name is spoken with a calling speech characteristic. If the trained name is spoken with a calling speech characteristic, the user may be provided with an alert at operation 614. Otherwise, certain embodiments will ignore the trained name if it is not spoken with a calling speech characteristic at operation 610 and continue with the speech detection of operation 602.

Figure 7:
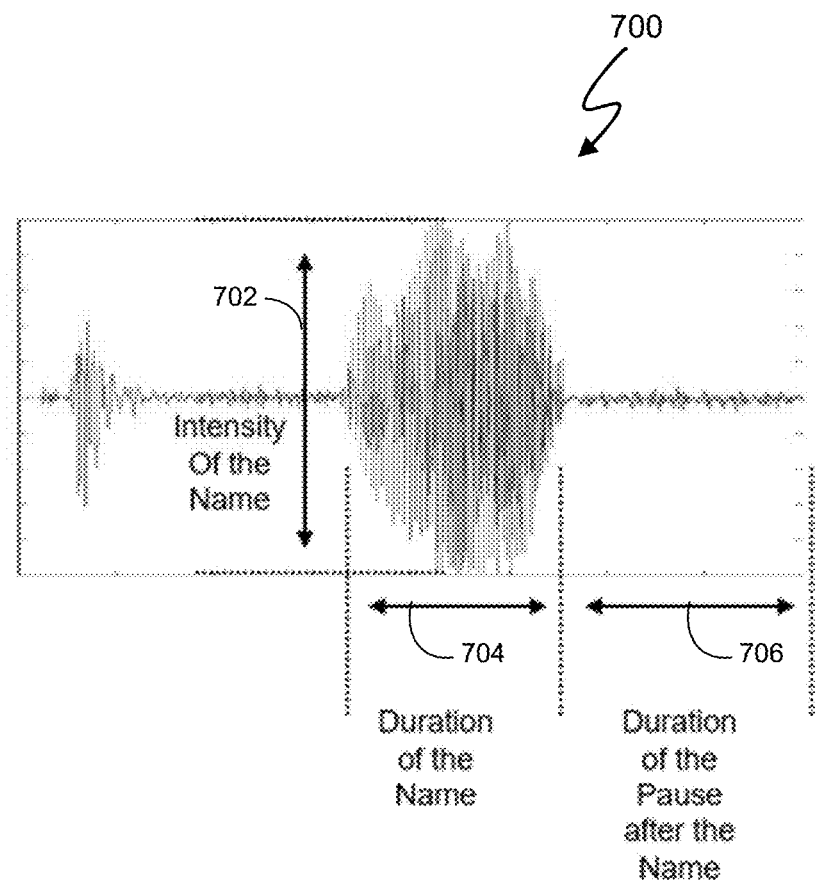
FIG. 7 depicts an exemplary audio waveform in which the name of an individual wearing an obstructive listening device is detected in the ambient environment.

FIG. 7 depicts an exemplary audio waveform 700 in which the name of an individual wearing an obstructive listening device is detected in the ambient environment. In certain embodiments, a machine language classifier uses the prosaic features of the waveform 700 to determine whether the name is spoken using a calling speech characteristic. In certain embodiments, the prosaic features include the intensity of the name 702 in the audio waveform 700 as determined, for example, by the amplitude (e.g., peak amplitude, average amplitude, etc.) of the portion of the waveform 700 that includes the name. As an example, names spoken with a higher intensity may be treated as more likely to have a calling characteristic than a name spoken with a lower intensity. In certain embodiments, the prosaic features include the duration 704 of the portion of the waveform 700 identified as including the name. As an example, names spoken with a shorter duration may be treated as more likely to have a calling characteristic than a name spoken with a longer duration. In certain embodiments, the prosaic features may include a duration of a pause 706 occurring after the portion of the waveform 700 identified as including the name. As an example, longer pauses may be treated as more likely to have a calling characteristic than pauses having a shorter duration. It will be recognized, in view of the teachings of the present disclosure, that various speech characteristics of the waveform 700 may be used to determine whether a name is spoken with a calling speech characteristic.

Figure 8:
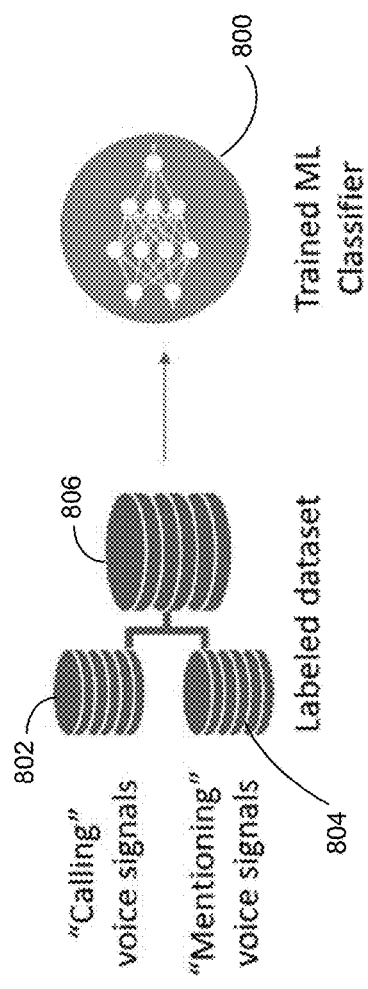
FIG. 8 depicts one manner of training a machine language classifier to recognize voice signals having a calling speech characteristic.

FIG. 8 depicts one manner of training a machine language classifier 800 to recognize voice signals having a calling speech characteristic. In certain embodiments, a set of voice signals labeled as having a calling speech characteristic 804 are combined with a set of voice signals labeled as having a mentioning speech characteristic 806 to provide a training data set 808. In certain embodiments, the machine language classifier 800 may be trained by leveraging deep neural network on the labeled dataset that contains the audio samples (e.g., way format) of names from the two labeled. In certain embodiments, the machine language classifier 800 may classify the speech characteristics of an audio file including a name as merely mentioning the name as part of a general conversation or classify the speech characteristics of an audio file including a name as having calling speech characteristics. Once the machine language classifier 800 has been trained, the machine language classifier 800 may be used to determine whether the detected name of an individual is spoken in the ambient environment using a calling speech characteristic.

Figure 9:
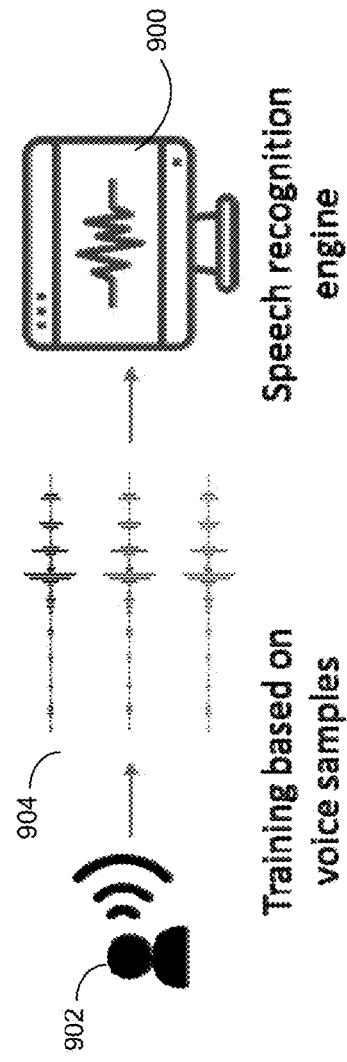
FIG. 9 depicts an example of an initialization operation that may be executed to train a speech recognition engine to recognize names in the audio of speech detected in the ambient environment.

FIG. 9 depicts an example of an initialization operation that may be executed to train a speech recognition engine 900 to recognize specific names in the audio of speech detected in the ambient environment. In certain embodiments, multiple audio recordings 904 of a name spoken by a single individual 902 may be used to train the speech recognition engine 900. In certain embodiments, multiple audio recordings 904 of the name spoken by multiple individuals may be used to train the speech recognition engine 900. In certain embodiments, the training of the speech recognition engine 900 may be limited to the names of individuals that are expected to listen to audio through an obstructive listening device using the information handling system.

Figure 10:
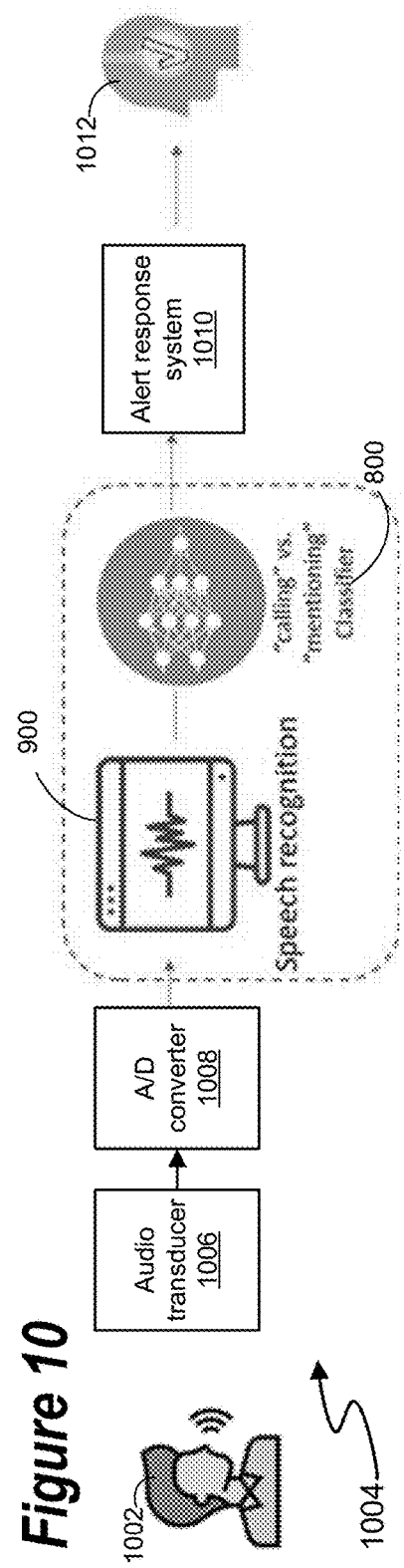
FIG. 10 depicts the use of a speech recognition engine and machine language classifier during operation of certain embodiments of the disclosed system.

FIG. 10 depicts the use of the speech recognition engine 900 and machine language classifier 800 during operation of certain embodiments of the disclosed system. In this example, the speech of an individual 1002 within ambient environment 1004 is detected at an audio transducer 1006 (e.g., microphone), which provides an analog signal of the detected speech to an analog-to-digital converter 1008. In certain embodiments, the digital signal output of the analog-to-digital converter 1008 is accessed by the speech recognition engine 900 to determine whether the digital signal output includes a recognized name (e.g., a trained name). In certain embodiments, the machine language classifier 800 uses the detected speech to determine whether the individual 1002 has spoken the name using a calling speech characteristic. If the name is spoken with a speech calling characteristic, certain embodiments actuate an alert response system 1010, which provides an alert to the user 1012 wearing the obstructive listening device indicating that a person within the ambient audio environment 1004 is attempting to gain the user's attention. As noted herein, in view of the teachings of the present disclosure, there are number of different manners in which the user 1012 may be alerted by the alert response system 1010.

As will be appreciated by one skilled in the art, the present invention may be embodied as a method, system, or computer program product. Accordingly, embodiments of the invention may be implemented in hardware, in software (including firmware, resident software, micro-code, etc.) or in an embodiment combining software and hardware. Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implemented method for voice-based alerting of a person wearing an obstructive listening device, comprising:
  detecting speech in an ambient environment in which the person wearing the obstructive listening device is present, wherein the speech is detected at an audio transducer of an information handling system;
  determining, using the information handling system, whether the detected speech includes a name of the person wearing the obstructive listening device;
  if the detected speech includes the name of the person wearing the obstructive listening device, determining, using the information handling system, whether the name of the person was spoken using a calling speech characteristic, the calling speech characteristic including a speech characteristic indicating an attempt to directly address the person wearing the obstructive device;

if the name of the person was spoken using a calling speech characteristic, using the information handling system to automatically alert the person wearing the obstructive listening device that another person in the ambient environment is calling for attention of the person wearing the obstructive listening device;

using a speech recognition engine of the information handling system to determine whether the detected speech includes the name of the person wearing the obstructive listening device; and using a machine learning classifier of the information handling system to determine whether the name of the person was spoken using a calling speech characteristic or non-calling speech characteristic, the non-calling speech characteristic comprising a mentioning speech characteristic, the mentioning speech characteristic including a speech characteristic indicating the name of the person was spoken in a manner other than the attempt to directly address the person wearing the obstructive device, the manner other than the attempt to directly address the person wearing the obstructive device comprising speaking the name of the individual wearing the obstructive listening device in a conversational manner, the machine learning classifier using prosaic features of an audio waveform of the detected speech to determine whether the name of the person was spoken using a calling speech characteristic or non-calling speech characteristic, the prosaic features including an intensity of the name in the audio waveform, a duration of a portion of the waveform identified as including the name and a duration of a pause occurring after the portion of the waveform identified as including the name.

2. The computer-implemented method of claim 1, further comprising:

training a machine learning model of a speech recognition engine of the information handling system, during an initialization operation, to recognize a name of one or more people who will wear an obstructive listening device to receive audio from the information handling system, wherein the training includes recording the name of one or more people who will wear the obstructive listening device.

3. The computer-implemented method of claim 1, wherein alerting the person wearing the obstructive listening device comprises one or more of:

using the information handling system to provide an automated visual indication to the person wearing the obstructive listening device that another person in the ambient environment is calling for the attention of the person wearing the obstructive listening device; and using the information handling system to attenuate a signal level of audio provided to the person wearing the obstructive listening device.

4. The computer-implement method of claim 1, wherein: the obstructive listening device is configured for wireless connection to an audio output of the information handling system.

5. The computer-implemented method of claim 1, wherein the information handling system includes at least one of:

a laptop computing system;
a desktop computing system;
a mobile device;
an audio entertainment system; and
a television entertainment system.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:

detecting speech in an ambient environment in which a person wearing an obstructive listening device is present, wherein the speech is detected at an audio transducer of an information handling system;

determining, using the information handling system, whether the detected speech includes a name of the person wearing the obstructive listening device;

if the detected speech includes the name of the person wearing the obstructive listening device, determining, using the information handling system, whether the name of the person was spoken using a calling speech characteristic, the calling speech characteristic including a speech characteristic indicating an attempt to directly address the person wearing the obstructive device; and if the name of the person was spoken using a calling speech characteristic, using the information handling system to automatically alert the person wearing the obstructive listening device that another person in the ambient environment is calling for attention of the person wearing the obstructive listening device;

using a speech recognition engine of the information handling system to determine whether the detected speech includes the name of the person wearing the obstructive listening device; and using a machine learning classifier of the information handling system to determine whether the name of the person was spoken using a calling speech characteristic or non-calling speech characteristic, the non-calling speech characteristic comprising a mentioning speech characteristic, the mentioning speech characteristic including a speech characteristic indicating the name of the person was spoken in a manner other than the attempt to directly address the person wearing the obstructive device, the manner other than the attempt to directly address the person wearing the obstructive device comprising speaking the name of the individual wearing the obstructive listening device in a conversational manner, the machine learning classifier using prosaic features of an audio waveform of the detected speech to determine whether the name of the person was spoken using a calling speech characteristic or non-calling speech characteristic, the prosaic features including an intensity of the name in the audio waveform, a duration of a portion of the waveform identified as including the name and a duration of a pause occurring after the portion of the waveform identified as including the name.

7. The system of claim 6, wherein the instructions are further configured for:

training a machine learning model of a speech recognition engine of the information handling system, during an initialization operation, to recognize a name of one or more people who will wear an obstructive listening device to receive audio from the information handling system, wherein the training includes recording the name of one or more people who will wear the obstructive listening device.

8. The system of claim 6, wherein the instructions are configured for alerting the person wearing the obstructive listening device using one or more of:
   using the information handling system to provide an automated visual indication to the person wearing the obstructive listening device that another person in the ambient environment is calling for the attention of the person wearing the obstructive listening device; and
   using the information handling system to attenuate a signal level of audio provided to the person wearing the obstructive listening device.

9. The system of claim 6, wherein:
   the obstructive listening device is configured for wireless connection to an audio output of the information handling system.

10. The system of claim 6, wherein the information handling system includes at least one of:
   a laptop computing system;
   a desktop computing system;
   a mobile device;
   an audio entertainment system; and
   a television entertainment system.

11. A non-transitory, computer-readable storage medium embodying computer program code, the computer program code comprising computer executable instructions configured for:
   detecting speech in an ambient environment in which a person wearing an obstructive listening device is present, wherein the speech is detected at an audio transducer of an information handling system;
   determining, using the information handling system, whether the detected speech includes a name of the person wearing the obstructive listening device;
   if the detected speech includes the name of the person wearing the obstructive listening device, determining, using the information handling system, whether the name of the person was spoken using a calling speech characteristic, the calling speech characteristic including a speech characteristic indicating an attempt to directly address the person wearing the obstructive device; and
   if the name of the person was spoken using a calling speech characteristic, using the information handling system to automatically alert the person wearing the obstructive listening device that another person in the ambient environment is calling for attention of the person wearing the obstructive listening device;
   using a speech recognition engine of the information handling system to determine whether the detected speech includes the name of the person wearing the obstructive listening device; and
   using a machine learning classifier of the information handling system to determine whether the name of the person was spoken using a calling speech characteristic or non-calling speech characteristic, the non-calling speech characteristic comprising a mentioning speech characteristic, the mentioning speech characteristic including a speech characteristic indicating the name of the person was spoken in a manner other than the attempt to directly address the person wearing the obstructive device, the manner other than the attempt to directly address the person wearing the obstructive device comprising speaking the name of the individual wearing the obstructive listening device in a conversational manner, the machine learning classifier using prosaic features of an audio waveform of the detected speech to determine whether the name of the person was spoken using a calling speech characteristic or non-calling speech characteristic, the prosaic features including an intensity of the name in the audio waveform, a duration of a portion of the waveform identified as including the name and a duration of a pause occurring after the portion of the waveform identified as including the name.

12. The non-transitory, computer-readable storage medium of claim 11, wherein the instructions are further configured for:
   training a machine learning model of a speech recognition engine of the information handling system, during an initialization operation, to recognize the name of one or more people who will wear an obstructive listening device to receive audio from the information handling system, wherein the training includes recording a name of one or more people who will wear the obstructive listening device.

13. The non-transitory, computer-readable storage medium of claim 11, wherein the instructions are further configured for alerting the person wearing the obstructive listening device using one or more of:
   using the information handling system to provide an automated visual indication to the person wearing the obstructive listening device that another person in the ambient environment is calling for the attention of the person wearing the obstructive listening device; and
   using the information handling system to attenuate a signal level of audio provided to the person wearing the obstructive listening device.

* * * * *